3,490,432
DRESSING MECHANISM
Herbert R. Uhtenwoldt, Worcester, Robert G. Hatstat, Rutland, and Donald R. Johnson, Worcester, Mass., assignors to The Heald Machine Company, Worcester, Mass., a corporation of Delaware
Continuation of application Ser. No. 590,884, Oct. 31, 1966. This application Feb. 6, 1969, Ser. No. 800,815
Int. Cl. B24b 53/04
U.S. Cl. 125—11                                     4 Claims

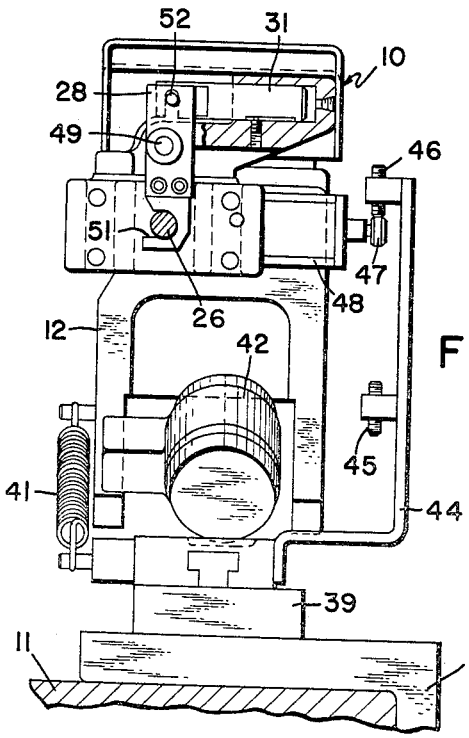
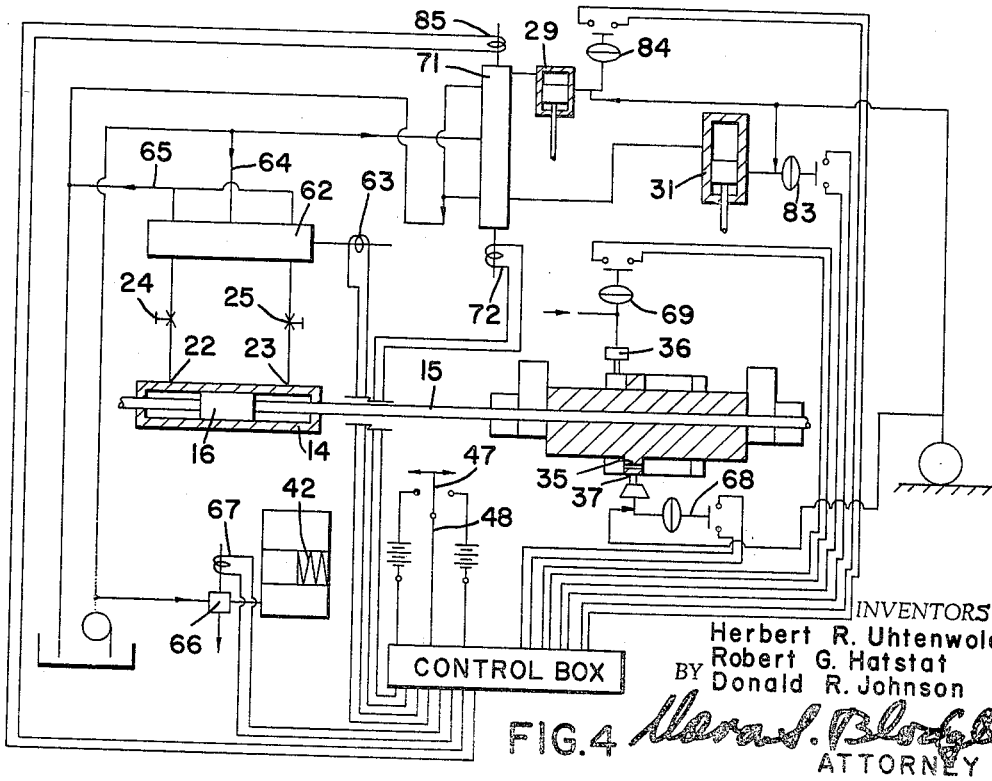
FIG.3
FIG.4
INVENTORS
Herbert R. Uhtenwoldt
Robert G. Hatstat
Donald R. Johnson
ATTORNEY United States Patent Office 3,490,432
Patented Jan. 20, 1970

ABSTRACT OF THE DISCLOSURE

A device for dressing the radius of two closely spaced abrasive wheels including a dressing tool mounted for movement through an arc with a device for selectively moving the dressing tool through a first portion of the arc at one end thereof or through a second portion of the arc at the other end thereof.

---

This application is a continuation of Ser. No. 590,884, filed Oct. 31, 1966, now abandoned.

There are many occasions in the operation of a grinding machine in which it is necessary to grind two parallel annular grooves at the same time, and this is sometimes accomplished by mounting two grinding wheels on the same shaft and bringing them into the grooves together. When the grooves are spaced apart a considerable distance, it is possible to use a single radius dresser and simply move the radius dresser from one wheel to another to provide a suitable dress for the wheel. There are situations, however, when the grooves are very close together and it is difficult to use a conventional radius dresser. The bulkiness of the holder for the diamond makes it difficult, if not impossible, to use the dresser for dressing one wheel without striking the other wheel and damaging it. Attempts have been made to overcome this difficulty by mounting the diamond directly on a thin rod which is very costly, but such apparatus (which lack bulk) also do not have the ability to resist deformation under the pressures of dressing, so that it is difficult to maintain the predetermined geometry. These and other difficulties, such as long dressing time and use of nonstandard diamond nibs, experienced with the prior art devices have been obviated in a novel manner by the present invention.

It is, therefore, an outstanding object of the invention to provide a dressing mechanism which is capable of quickly dressing two abrasive wheels which are closely spaced on the same shaft.

Another object of this invention is the provision of a radius dresser which, in groove grinding, is capable of dressing the radius of two closely spaced abrasive wheels.

A further object of the present invention is the provision of a dressing mechanism capable of dressing closely spaced abrasive wheels, which mechanism is rugged in construction and is capable of retaining wheel geometry despite the pressures due to the dressing action.

It is another object of the instant invention to provide a dressing mechanism including a dressing tool mounted for movement through an arc, wherein means is provided for selectably moving the tool through a first portion of the said arc at one end thereof or through a second portion of the arc at the other end thereof.

With these and other objects in view, as will be apparent to those skilled in the art, the invention resides in the combination of parts set forth in the specification and covered by the claims appended hereto.

Figure 1:
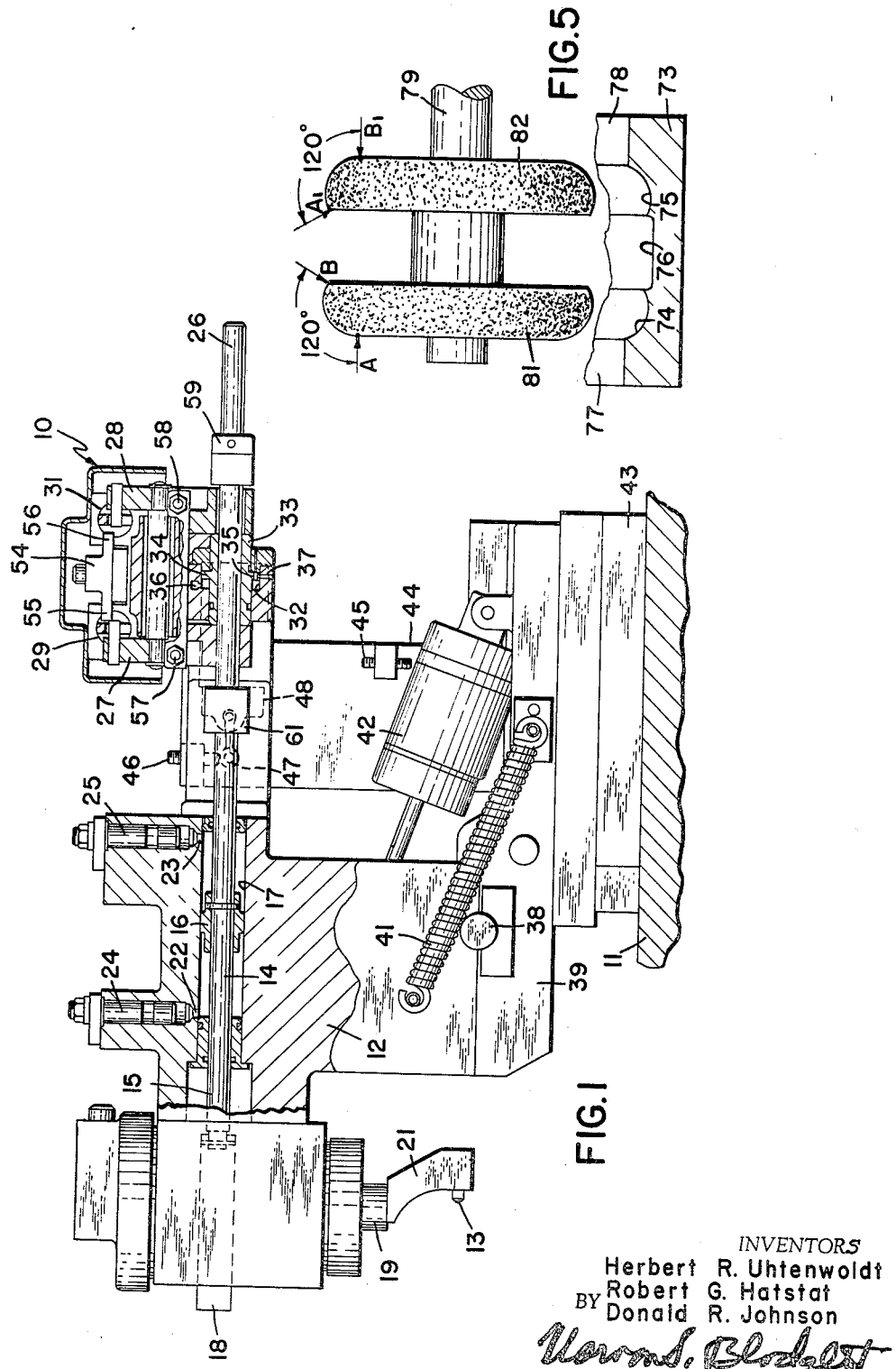
Figure 2:
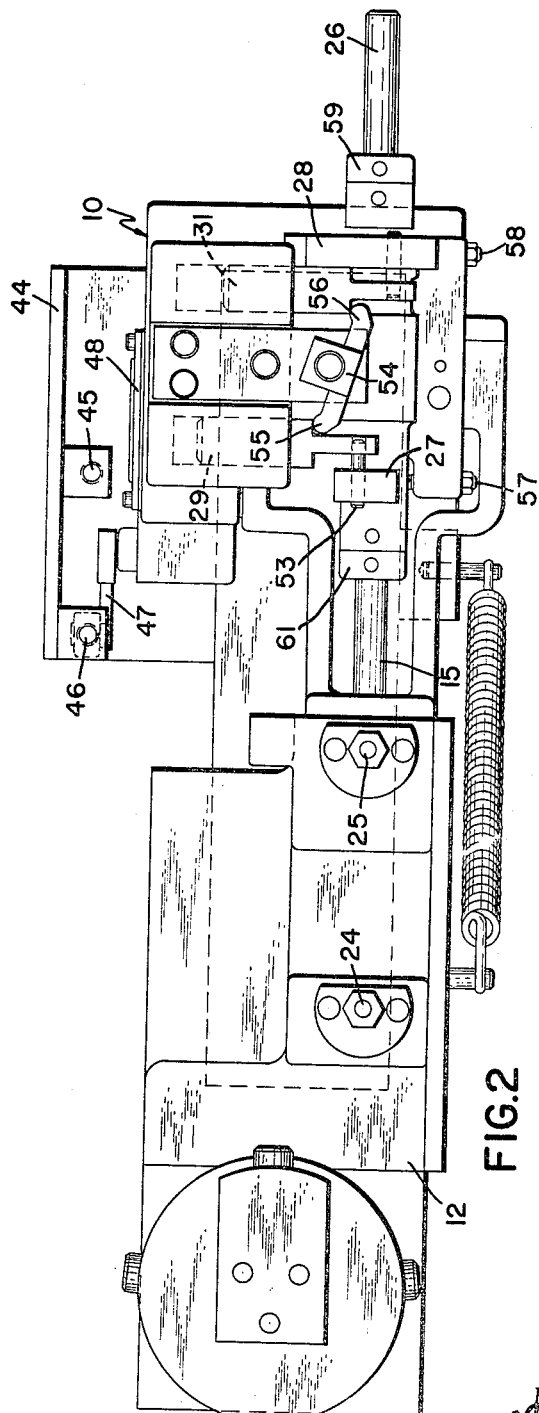

The character of the invention, however, may be best understood by reference to one of its structural forms as illustrated by the accompanying drawings in which:

FIG. 1 is a side elevational view with portions broken away of a dressing mechanism embodying the principles of the present invention, FIG. 2 is a plan view of the mechanism, FIG. 3 is an end view of the mechanism taken from the right hand side of FIG. 1, FIG. 4 is a schematic view of certain hydraulic and pneumatic apparatus associated with the mechanism, and FIG. 5 is a schematic view of a portion of the grinding machine illustrating the operation of the mechanism.

Referring to FIGS. 1, 2, and 3, wherein are best shown the general features of the invention, the dressing mechanism, indicated generally by the reference numeral 10, is shown as mounted on a grinding machine 11. This grinding machine is of the type shown and described in the patent of Hohler No. 3,197,921 which issued Aug. 3, 1965. The grinding machine is provided with a series of controls such as is shown and described in the patent of John Klar, No. 3,341,980 which issued Sept. 19, 1967, permitting it selectively to operate through various complicated cycles which include, on occasion, the dressing of the abrasive wheels. The mechanism is provided with a support 12 on which is mounted a dressing tool 13, such as a diamond. The tool 13 is mounted on the support 12 for arcuate movement to generate an annular surface on an abrasive wheel which is brought into contact with it. Formed as part of the mechanism is a means for selectively moving the tool through a first portion of the arc at one end thereof or through a second portion of the arc at the other end thereof.

The tool is rotated by a linear actuator 14 consisting of a rod 15 on which is mounted a piston 16 which, in turn, slides in a bore 17 formed in the support 12. The outer end of the rod is provided with a rack 18 which engages a pinion (not shown) keyed to a vertical shaft 19 which is rotatable in the support 12 and which carries at its lower end an arcuate extension 21 which carries the dressing tool 13. The opposite ends of the bore 17 are provided with ports 22 and 23 provided, respectively, with valves 24 and 25. The rod 15 is provided at the right hand side in FIG. 1 with an extension rod 26 with which are associated spacers 27 and 28 each of which is movable on occasion from an inoperative position away from the rod 26 to an operative position embracing the rod 26. The spacers 27 and 28 are provided with linear actuators 29 and 31, respectively, which serve the function of bringing about this motion. The rod 26 extends through a counterbore 32 in the support 12 and surrounding the rod in this area is a sleeve 33, the main body being substantially less than the diameter of the bore 32. Extending radially outwardly from the central portion of the sleeve 33, however, is a flange 34 which fits tightly in the bore 32 and which has an axial passage 35 extending entirely therethrough. At one end of the bore 32 is provided a port 36 and at the other end a port 37.

The support 12 is pivotally mounted on a hinge pin 38 for swinging movement relative to a base 39. A coil spring 41 extends between the base 39 and the support 12 to bias the support into an upper position. Also, a linear actuator 42 extends between these two members to bias them to the lower position shown in FIG. 1. The base 39 is provided with a sub-base 43 which is fastened to the grinding machine 11, there being an arrangement between the base 39 and the sub-base 43 to provide for linear adjustment between the two.

As is particularly evident in FIG. 3, a bracket 44 is mounted on the side of the base 39 and extends upwardly beside the support 12. At a lower position, it is provided with an adjustable stop screw 45 and at an upper position it is provided with a stop screw 46, both stop screws being located in position to be engaged on occasion by the actuating finger 47 of a switch 48 which is mounted on the back side of the support 12.

The spacer 28 is pivotally attached to the support 12 by a central pivot pin 49. At its lower end it is provided with a notch 51 which is capable of embracing, on occasion, the rod 26. At its upper end it is connected by a pin 52 to the outer end of a piston rod of the actuator 31. In a similar way, the spacer 27 is pivoted in its central point and connected at its upper end by a pin 53 to the outer end of a piston rod of the actuator 29. In between the actuator 29 and the actuator 31 there is mounted on a vertical pivot a bellcrank 54 having a horn 55 which extends from one side and engages the piston rod of the actuator 29 and having a horn 56 which extends from the other side and engages the piston rod of the actuator 31. A stop screw 57 engages and limits the motion of the spacer 27, while a similar stop screw 58 engages and limits the motion of the spacer 28. An adjustable spacer block 59 is mounted on the outer end of the rod 26. An adjustable spacer block 61 is mounted on the rod 26 adjacent the spacer 27.

Referring now to FIG. 4, which shows the manner in which the controls are interconnected, it can be seen that the opposite ends of the actuator 14 are connected through the ports 22 and 23 and the valves 24 and 25 to a servo valve 62 whose plunger is operated by a coil 63. Pressure oil is supplied to the valve through a line 64, while a line 65 connects the valve to a sump of the hydraulic pressure system. The actuator 42 is connected to a pressure oil source (not shown) through a valve 66 operable by a coil 67, this being at the side of the piston rod opposite that from which the piston rod extends, since the actuator is moved in the opposite direction when pressure is removed by the operation of the spring 41. In this view is shown the switch 48 whose operating finger 47 is contacted and moved by engagement with the stop screws 45 and 46, the switch being shown as a single-pole double-throw electrical switch. The port 37 associated with the sleeve 33 is connected to an air pressure switch 68 and, of course, to a source of air. Similarly, the other port 36 is connected to an air pressure switch 69. The outer ends of the actuators 29 and 31 are connected to a servo valve 71 operated by coils 72 and 85; the valve is connected to a source of pressure fluid and to its sump.

The operation of the apparatus will now be readily understood, in view of the above description. The manner in which it works can best be understood by referring first to FIG. 5, wherein is shown a workpiece 73 which, for the purposes of illustration, is shown as the outer race of a double-row ball bearing. The workpiece has two annular grooves 74 and 75. The common sides of the two grooves are joined by a cylindrical land 76 whose diameter is considerably greater than that of the lands 77 and 78 into which the outer edges of the grooves 74 and 75, respectively, join. The cross section of the grooves, therefore, is not semi-circular, but fails to subtend 180° by substantial amounts. For the purposes of illustration, each groove surface subtends an angle of 120°, the major portion of the arc of the grooves lying on the sides furthest away from one another. The grinding machine is provided with a spindle 79 on which are mounted an abrasive element consisting of abrasive wheels 81 and 82. As is evident from the drawing, it is necessary to dress 120° of the wheel 81 from the point A to the point B and it is necessary to dress 120° of the wheel 82 from the point $A_1$ to the point $B_1$. For that purpose, when the point in the cycle of grinding of the grooves 74 and 75 is reached at which it is necessary to dress the wheels 81 and 82, the wheels and spindle are removed from the workpiece and carried to a position in the grinding machine 11 adjacent the dressing mechanism 10. The dresser is brought down by the energization of the actuator 42, an electrical signal arriving on the coil 67 and opening the valve 66 to allow pressure oil to enter the lower end of the cylinder. The dresser at the end of the stroke of the actuator 42 occupies the position shown in FIG. 1. The arrival at this position is indicated by the finger 47 of the switch 48 striking the upper stop screw 46. At that point, further energization of the actuator 42 is stopped and the oil is locked in place by suitable energization of the valve 66. The dressing tool or diamond 13 is in the position of A of FIG. 5. The spacer 27 is in raised position with its notch surrounding the rod 26, while the spacer 28 is in down position embracing the rod 26. This is indicated to a pressure switch 83 associated with the actuator 31. A similar pressure switch 84 is associated with the actuator 29 indicating that it is in the forward position, i.e., the spacer 27 is out of engagement with the rod 26. The coil 72 is de-energized and the pressure switch 83 indicates that the actuator 31 is in such condition that the spacer 28 is in the down or operative position. The coil 85 associated with the servo valve 71 is energized and the pressure switch 84 indicates that the actuator 29 is in such a condition that the spacer 27 is out of engagement with the rod 26. In this condition, the diamond starts rotating under the impetus of the actuator 14, the solenoid valve 62 having received an electrical signal on the coil 63 that the wheel 81 was opposite the diamond 13. The diamond rotates about its vertical shaft 19 and moves across the wheel 81 from the point A to the point B through 120°. The spacer block 59 strikes the spacer 28 which, in turn, pushes against the sleeve 33 until the flange 34 covers the port 36 and indicates to the pressure switch 69 that the left-hand end of the stroke has been reached. Also, the port 37 is uncovered causing the pressure switch 68 to operate to raise the dresser by releasing oil from the actuator 42 so that the spring 41 lifts the support 12 and rotates it about the pivot hinge 38. When the dresser reaches the "up" position, the finger 47 of the switch 48 strikes the lower stop screw 45 and indicates that the position is completed, so that the grinding machine 11 knows that it is possible without damage to the machine to move the wheelhead to bring the wheel 82 into position against the dresser. When this up position is reached, the coil 85 is deenergized and the coil 72 is energized, thus causing spacer 27 to move into "down" position adjacent the rod 26 while the spacer 28 moves upwardly. When these conditions are reached, this fact is indicated to the pressure switches 83 and 84 and communicated to the machine controls. With the solenoid 72 energized, the actuator 31 causes the latch 28 to be in the "up" position and the pressure switch 83 indicates this by its condition. The spacer block 61 engages the spacer 27 when the dressing tool is in the $A_1$ position, thus causing the right pressure switch 37 to break contact and the left pressure switch 69 to make contact, thus sending the dresser down. This is done by energizing the coil 67 of the valve 66 and operating the actuator 42. When the dresser reaches the "down" position, this is indicated by the switch 48 being operated by engagement with the stop screw 46. The diamond 13 is now in the $A_1$ position against the wheel 82. The operation of the switch 48 starts the diamond rotating from $A_1$ to $B_1$. When this last point is reached, the pressure switches 68 and 69 operate and cause the spacer 27 to move to the "up" position and the spacer 28 to move to the "down" position again. The spacer 28 pushes against the spacer 59 which has pushed the sleeve 33 from right to left, causing the left pressure switch 69 to break contact and the right pressure switch 68 to make contact to raise the dresser again. When the dresser is in the "up" position, the limit switch 48 initiates a resetting to position A again. While this is going on, the spacer 28 moves completely into position against the rod 26. The dresser is made to operate on one wheel or the other by the main table cylinder of the grinding machine, this cylinder moving the wheelhead longitudinally relative to the dresser.

It can be seen, then, that, when the spacer 27 is in operative position away from the rod 26, the block 61 is free to engage the left-hand side of the sleeve 33 and to push it to the right. Similarly, when the spacer 28 is in operative position, the block 59 is free to engage the sleeve directly and push it to the left. On the other hand, when the spacer 27 is in its operative position against the rod 26, the block 61 pushes against the spacer 27 and cannot operate on the spacer 33. This is also true when the spacer 28 is in the "down" or operative position; it prevents the block 59 from engagement with the sleeve 33. However, the spacers are free to move lengthwise of the rod 26 relative to the support 12 so that the block 61 can engage the spacer 27 to push the sleeve 33, while the block 59 can push the sleeve 33 by operating through the spacer 28. The spacers operate to remove a portion from one end or other of the 180° arc.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A dressing mechanism for a grinding machine housing an abrasive element, comprising
   (a) a support,
   (b) a dressing tool mounted on the support for movement through an arc lying in a plane to generate an annular surface on the abrasive element, and
   (c) means selectively moving the tool through a first portion of the said arc at one end thereof or through a second portion of the said arc at the other end thereof, the said means comprising a linear actuator having a rod extending in the direction of motion and also comprising limiting devices which determine the length of the said arc and the length of the first and second portions thereof, the limiting devices including spacers which move on occasion into operative relationship to the rod and are movable to and from such relationship by actuators.

2. A dressing mechanism as recited in claim 1, wherein the limiting devices include a sleeve slidable on the rod and having a radially-extending flange which operates sensing devices to indicate various positions of the sleeve lengthwise of the rod.

3. A dressing mechanism for a grinding machine housing an abrasive element, comprising
   (a) a support,
   (b) a dressing tool mounted on the support for movement through an arc lying in a plane to generate an annular surface on the abrasive element, and
   (c) means selectively moving the tool through a first portion of the said arc at one end thereof or through a second portion of the said arc at the other end thereof, the means consisting of a rod which is reciprocable to rotate the dressing tool through the arc, two blocks being mounted on the rod in spaced relationship, a spacer being associated with each block and movable toward or away from engagement with the rod adjacent its respective block on the side of the block facing the other block, each spacer having a face which is directed along the rod toward a corresponding face of the other rod, and a sleeve slidable on the rod between the two faces, and means associated with the sleeve to regulate rod reciprocation and tool rotation.

4. A dressing tool as recited in claim 3, wherein each spacer comprises a lever which is pivoted on an axis parallel to the rod axis, wherein each spacer has an actuator to swing it about its axis, and wherein a bellcrank extends between the two actuators to cause one spacer to swing in one direction while the other spacer swings in the other direction.

References Cited

UNITED STATES PATENTS

| 1,245,814 | 11/1917 | Stansbury | 125—11 |
| 1,266,707 | 5/1918 | Olson | 125—11 |
| 2,314,483 | 3/1943 | De Vlieg. | |
| 2,665,681 | 1/1954 | Haas | 125—11 |
| 3,093,128 | 6/1963 | Seidel | 125—11 |
| 3,242,918 | 3/1966 | Striepe | 125—11 |
| 3,269,381 | 8/1966 | Healy | 125—11 |

HAROLD D. WHITEHEAD, Primary Eaminer